United States Patent [19]
Winsel et al.

[11] 3,770,509
[45] Nov. 6, 1973

[54] DUPLEX GAS DIFFUSION ELECTRODES WITH GAS DIFFUSION MEANS

[75] Inventors: August Winsel; Stempel Guenter; Gruene Horst; Kurt Weidinger, all of Kelkheim/Taunus, Germany

[73] Assignee: Varta Aktiengesellschaft, Frankfurt/Main, Germany

[22] Filed: Nov. 22, 1967

[21] Appl. No.: 685,165

[30] Foreign Application Priority Data
Nov. 24, 1966 Germany............................ V 32412

[52] U.S. Cl. ......................................... 136/120 FC
[51] Int. Cl. ......................................... H01m 13/06
[58] Field of Search........................ 136/120 FC, 86

[56] References Cited
UNITED STATES PATENTS

| | | | |
|---|---|---|---|
| 3,276,911 | 10/1966 | Schoeneweis................. | 136/120 FC |
| 3,238,069 | 3/1966 | Guth............................. | 136/120 FC |
| 3,311,507 | 3/1967 | Dittmann et al................ | 136/86 D |
| 3,513,029 | 5/1970 | Giner et al..................... | 136/120 FC |
| 3,322,576 | 5/1967 | Young ........................... | 136/121 |
| 3,404,038 | 10/1968 | Winsel ........................... | 136/86 |

FOREIGN PATENTS OR APPLICATIONS

| | | | |
|---|---|---|---|
| 1,054,247 | 1/1967 | Great Britain................ | 136/120 FC |

Primary Examiner—L. Dewayne Rutledge
Assistant Examiner—M. J. Andrews
Attorney—McClure and Weiser

[57] ABSTRACT

A multilayered gas diffusion unitary electrode body for an electrochemical apparatus, fuel cell elements and an electrolysis cell, said gas diffusion electrode having two catalytically active layers and comprising two electrode parts, each part having at least two layers, said parts being bonded to each other into a unitary construction by a bonding or connecting middle layer which joins the respective larger pore layers of the respective electrode parts, said bonding layer comprising a resin or resin coated metal foil or web. A fuel cell battery comprising such multilayered electrodes. A method for bonding the electrode to give the structure described.

3 Claims, 14 Drawing Figures

INVENTORS.
AUGUST WINSEL
GUENTER STEMPEL
HORST GRUENE
KURT WEIDINGER

INVENTORS.
AUGUST WINSEL
GUENTER STEMPEL
HORST GRUENE
KURT WEIDINGER

BY McClure + Weiser
ATTORNEY.

DUPLEX GAS DIFFUSION ELECTRODES WITH GAS DIFFUSION MEANS

This invention is concerned with a gas diffusion unitary electrode body or unitary electrode structure having two operative or working sides, hereinafter designated as the "catalytically active layers", the electrode body being especially suited for electrochemical devices and apparatus. The invention also relates to a process for manufacturing the unitary electrode body, an electrochemical apparatus which comprises the unitary electrode body and a method of use thereof.

Gas diffusion electrodes are widely used in fuel cell elements, electrolytic processes, and as a gas consuming, so called "third" electrode in accumulators. The gas diffusion electrodes are porous bodies into which electrolyte penetrates from one side and gas from the other side, so that within the pores of the electrode body there is established an electric current-supplying tri-phase boundary of electrode, electrolyte and gas.

In particular, for the electrochemical conversion of reaction gases which include inert gases in fuel cells, the Janus electrode has proven itself especially useful. This type of electrode, which comprises three or five layers can have a catalytically active working layer portion which has coarse pores and two porous catalytically inactive surface layer portions having fine pores and covering the working layer portion and being connected thereto or a central porous gas distribution layer portion, an intermediate catalytically active porous working layer portion covering each side of the gas distribution layer portion and being connected thereto, and a peripheral porous surface layer portion covering the working layer portion and being connected thereto. The surface layer portion is provided with an average pore radius which is smaller than the average pore radius of the working layer portion. Such electrode is described in U.S. Pat. No. 3,311,507, which is incorporated herein by reference. In this type of electrode, the gas supply is provided, e.g. from the borders of the electrode.

An important advantage of the Janus electrode over the conventional double layer electrodes is that no significant mechanical stress due to pressure differential between the gas and electrolyte compartments prevails on the electrode; the forces due to pressure being taken up within the interior of the sintered electrode body.

The Janus electrode in effect, therefore, is a unitary body of two electrodes which have one operative side, two layers of same polarity, the electrodes being electrically connected and mechanically supporting each other.

In the manufacture of such three- or five-layered electrodes there results therein certain serious shortcomings; particularly the very thin cover layers can only be affixed with the greatest difficulty in the necessary evenness on both of the outer facing sides of the electrodes during the filling into the press or the sinter mold. Also, it is an important shortcoming that in the Janus electrode the two dies can be electrochemically only of same polarity.

Those skilled in the art have therefore been confronted with the problem of finding a gas diffusion electrode which is multilayered, has two catalytically active operative sides, overcomes the known shortcomings of the Janus electrode, and is still relatively simple to construct. The shortcoming of the Janus electrode have been overcome by the present invention, which provides an improved electrode body having even further unexpected advantages.

Various embodiments and objects of the invention will become apparent from a further study of the specification and accompanying drawings in which.

The gas diffusion unitary electrode body or unitary electrode structure of the invention, hereinafter referred to as electrode body, has two catalytically active sides and comprises two electrode parts, each part having at least two layers, the catalytically active layer which in certain embodiments of the invention is also the gas conducting or distributing layer, and the covering or surface layer of the electrode parts being connected to each other to form a unitary inseparable structure by means of a connecting layer which comprises a resin. Thus, by being bonded to each other by the catalytically active layer which is then also the gas-conducting layer, or by the gas-conducting, catalytically inactive layer, the two electrode parts are permanently connected to each other by their respective larger pore layer. The gas-conducting layer can be a distinct layer from the catalytically active working layer or the latter layer can be a layer which fulfills both the function of a gas-conducting and catalytic layer.

In an embodiment of the invention, the electrode body of the invention is three-layered and comprises a centrally positioned middle connecting layer which is gas previous and supplies a reacting gas to the adjoining surface of the next layer. The connecting layer is permanently connected on each of its faces to a catalytically active working layer. The catalytically active layers have pores of a size small enough to prevent the gas from flowing through these layers while they are filled with electrolyte. The tri-phase boundary is formed at the inner faces of the working layers. In another embodiment, which presently has been found quite advantageous, the electrode body has five layers. It comprises the centrally positioned connecting layer having connected on each side thereof a catalytically active working layer adapted to be gas conductive and a covering layer connected and affixed on each catalytically active working layer.

The catalytically active, gas-conducting layer can be a layer which is riddled with coarse pores which carry the reaction gas, these pores being in communication with interspersed smaller pores in which there is present the electrolyte. Suitable electrode bodies having such electrode layers are disclosed in patent application Ser. No. 495,323 and their description is incorporated herein by reference. When the electrode body of the present invention comprises such a gas-conducting catalytically active layer, the covering laye as pores, the average pore radius of which is smaller than the average pore radius of the catalytic layer, so that the gas in the gas layer does not penetrate the electrolyte compartment.

The electrode body of the invention comprises two catalytically operative surfaces in one unitary, permanent structure, which can in certain embodiments even exhibit each one a different polarity.

In another embodiment of the invention, the electrode body has seven layers, in which case the connecting layer has affixed on each side a gas-conducting or distribution layer which in turn has affixed thereto a catalytically active layer hich is followed by the outer or cover layer, as described above.

When the catalytically active layers of the individual electrode parts possess a pore system which is also suited for the feeding and removal of the selected gaseous reactants, the electrode body of the invention is an ideal gas diffusion electrode having two catalytically operative sides. If the individual electrode parts do not possess such gas-conducting layers, the connecting layer between the two electrode parts can be built to accomplish this function by providing it with gas conduits.

In accordance with the invention, the two individual electrode parts are connected into a unitary electrode structure by providing that the connecting layer fills at least in part the surface pores of the sides of the individual electrode parts which adjoin the connecting layer, namely the gas-conducting layer.

In an embodiment of the invention the connecting layer electrically isolates the individual electrode parts from each other so that the electrodes of the invention can operate as electrically isolated individual electrodes in two adjoining cells of a battery, although they are provided with a gas conduct means. In such an electrode there is used for the connecting layer a conventional electrically isolating plastic which may, if desired, also comprise electrically isolating, non-conductive fillers like aluminum oxide, asbestos or kieselgur. A preferred composition comprises about 30 to 70 percent by weight of a polyolefin and about 70 to 30 by weight of magnesium oxide.

In another embodiment of the invention, the individual respective electrode parts can be constructed as opposite electrodes so that one can operate as a hydrogen and the other as an oxygen electrode. In such an electrode, the parts of the electrode which are connected by the common connecting layer must be provided with separate inlets for the gases. However, in accordance with the invention, where the individual electrodes are of opposite polarity, it is not always necessary that the two electrode parts be electrically insolated from each other. Often it is desirable to connect the two cells, of which the individual electrodes are a component in series by electrically connecting the two individual electrodes. This can be accomplished by constructing the connecting layer so that it comprises an electrically conductive resin.

To make the synthetic thermoplastic electrically conductive, there may be incorporated, for instance, into the plastic base material prior to calendering a metal or graphite powder. The electrical conductivity of the plastic for the connecting layer need not therefore be especially high, an electrical conductance of $1 \, \Omega^{-1} \times cm^{-1}$ being adequate. Such a plastic causes a drop of potential of less than 1 mV at a current density of 100 $mA/cm^2$ for a connecting layer of 0.01 cm thickness. Particularly suitable thermoplastic materials include a polyolefine, polystyrene, polyvinyl chloride, and polymethacrylate. Particularly suitable electrically conductive powders which are suitable for admixing thereto include noble metals (with reference to the resistivity of the electrolyte) especially carbonyl nickel, electrolyte copper and graphite. Particularly suitable because of their adhesive strength, their electrical conductivity and their desirable plastic flow is a connecting layer comprising about 80 to 97 percent by weight of carbonyl nickel powder and 20 to 3 by weight of polyethylene.

Many gas diffusion electrodes are porous metal bodies which in general can be well wetted and coated with a resinous or plastic adhesive. A further embodiment of the invention provides a unitary electrode body of two individual electrodes comprising a connecting middle layer which comprises a metallic carrier whose surfaces have been coated with a two component adhesive which has good wetting and adhesive properties. If desired, to improve the adhesion, the metallic carrier can be first chemically or electrolytically etched. The connecting layer is positioned between the two electrodes to be connected so that the two electrolyte facing sides are separated from each other; the adhesive coats are adjoining porous layers of the electrodes so that, after curing, the adhesive fastens the two individual electrode parts to the metallic carrier. The electrodes by their contact to the metallic carrier establish electrical contact between the metallic electrically conductive carrier and the electrode. The resulting double electrode of the invention is thus a unitary electrode body having electrically connected electrode parts.

In accordance with the invention any known metal adhesive may be used to bond the individual parts of the electrode into a unitary electrode entity with the metallic carrier. Suitable adhesives include the epoxy resins, nitrocellulose resins, polyesters, polyurethanes and other suitable resins, as disclosed for instance in Textbook of Polymer Science, Billmeyer, Jr., Interscience Publishers (1964). The resins are thermosetting, inert and resistant under condition of use of the electrodes of the invention.

In the electrode bodies of the invention which have electrode parts which are identical, a bridging continuous metallic carrier can be an obstacle to the passage of gas. On the other hand, when the carrier is made of parallel or criss-cross or net-like disposed wires, electrical contact is satisfactorily accomplished, as well as mechanical support. Concurrently, adequate inner space remains within the layer for the passage of the reaction gas. This is particularly important when the gas is cycled for removal of water of reaction.

As is evident from the above description, the metallic carrier which serves as the connecting layer can be impervious, i.e. non-perforated, or it may be a perforated or porous metal body such as a sheet or a foil; a layer of sintered metal particles, a web, a net-like structure and the like. Generically these various structures are defined herein as a "web".

When in accordance with the invention, it is preferred to electrically isolate the two parts of the connecting body, the metallic carrier may be substituted by a carrier body made of plastic which may assume the form or shape of a foil as well as that of a net or of a layer of suitered particles of resin. It is highly desirable that the adhesive used adequately coats the synthetic plastic so that a film always adheres on the carrier, notwithstanding the sucking effect exerted on the porous electrode. Normally, the adhesive will not be one which is capable of softening the plastic under the manufacturing conditions of the electrode and permeate through the electrode parts to the surface pores and seal these thereby.

In accordance with the invention, the thickness of the connecting middle layer is dependent on the function which it is required to perform. In general, this layer is thicker when it serves as the gas-conducting layer than when it is to serve as electrical contact layer. The bonding layer will generally be of a thickness varying from 0.01 to 0.5 cm, preferably 0.02 to 0.1 cm.

The electrode bodies of the invention combines the method for manufacturing a double or tri-layered gas-diffusion electrode with one operative side with the advantages of the Janus electrode with respect to the conversion of the inert gas mixtures. The electrode bodies of the invention solve also another problem encountered with various conventional electrodes. When an electrode is positioned as a separator between gas and electrolyte compartments, the gas pressure cannot exceed a certain maximum limit to avoid deformation and rupture of the electrode. With electrodes of large surfaces the tolerance for excess pressure is quite limited, and it is critical that the gas pressure be not unduly forced. However, in the electrode bodies of the invention by virtue of their connecting layers, numerous connecting links are established between the electrode surfaces, and the gas pressure is redistributed and it can again be significantly increased. Thus, the operating gas pressure of the cell can be raised to levels essentially independent of the size of the surfaces of the electrode.

In accordance with the process of the manufacture of the electrode body of the invention, the electrode body can be manufactured from two similar gas-diffusion electrodes, each one of which comprises a cover layer, a catalytically active or working layer, and if desired, an additional gas-conducting layer. Between the two electrodes there is disposed a thermoplastic foil and then the assembly is placed into a pressing matrix. The two electrodes and the intermediate bonding layer are so disposed with respect to each other that the fine-pored or the hydrophyllic cover layers of the electrode, whichever is the case, are so disposed to be furtherest away fro the synthetic plastic foil or bonding layer. The assembly is then heated up to or just below the flow temperature of the thermoplastic material, and the two individual electrode parts are pressed together. While under pressure, the thermoplastic is pressed into at least a portion of the surface pores of the layer adjoining it. After discontinuing heating and pressure, and upon cooling, the previously separated parts of the electrode body are now bound or cemented tightly onto the synthetic plastic foil forming therewith the unitary electrode body of the invention.

Figure 1:
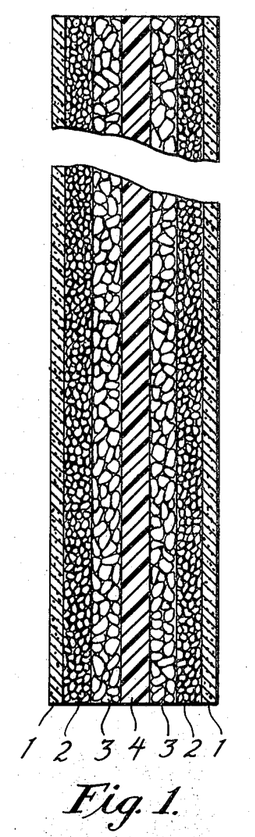
FIGS. 1 and 2 are a schematic sectional view of two embodiments in accordance with the invention of an electrode body having seven layers and five layers, respectively.

Suitable pressure and temperature ranges are the following:
pressure from 0,010 t/cm$^2$ to 0,500 t/cm$^2$
temperature from 100°C to 450°C Referring now to FIG. 1 which illustrates an electrode unitary body having seven layers, the covering layers 1 cover the catalytically active working layers 2 adjoining the gas conducting layers 3 which both are permanently affixed onto the insulating or connecting central layer 4.

Figure 2:
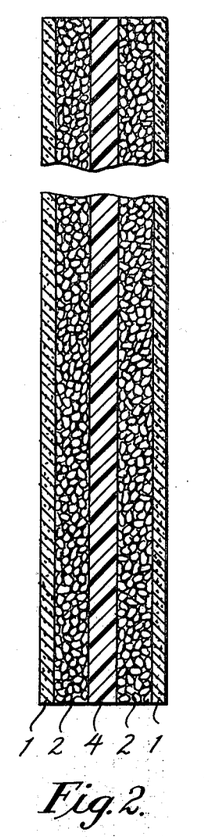

In FIG. 2 which illustrates an electrode unitary body having five layers, the catalytically active layers 2 have coarse pores and are the gas conducting layers.

Figure 3A:
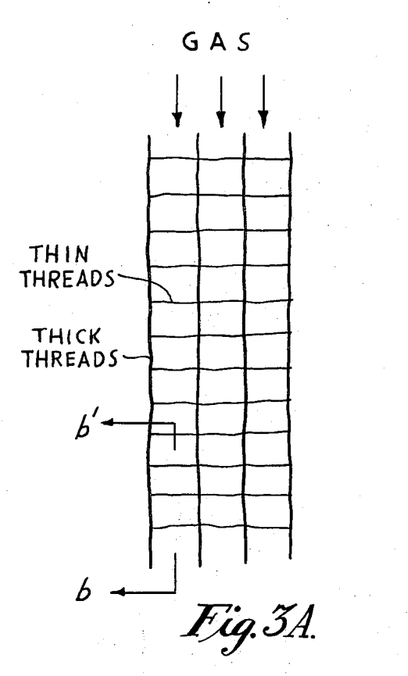
FIGS. 3A, 3B and 3C are schematic views of various illustrations of an enlargement of sections of the connecting layer.
Figure 3B:
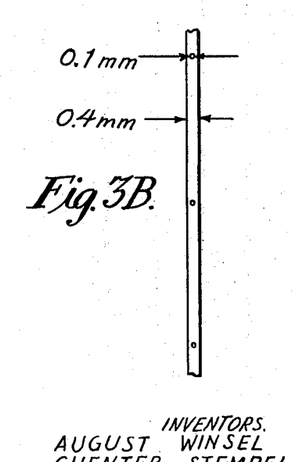

FIGS. 3A and 3B illustrate an enlarged view of details of various embodiments of the connecting layer 4. The resin layer forms gas-conducting bands; thin threads and wider threads, as illustrated. FIG. 3B is a vertical cut along $bb'$ of threads of about 0.1 mm of diameter in threads of 0.4 mm of diameter.

Figure 3C:
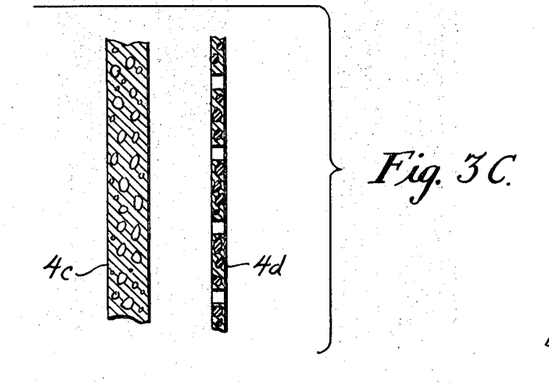

FIGS. 3C shows as 4C a layer of sintered plastic particles, or sintered metal particles, and as 4D, a metal net.

Figure 4:
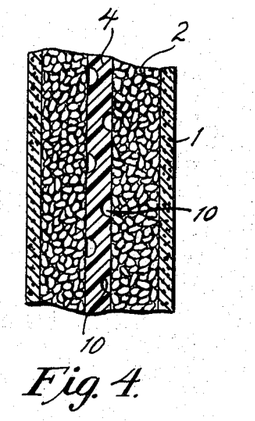
FIGS. 4 and 5 illustrate a particular desirable embodiment of the connecting layer.
Figure 5:
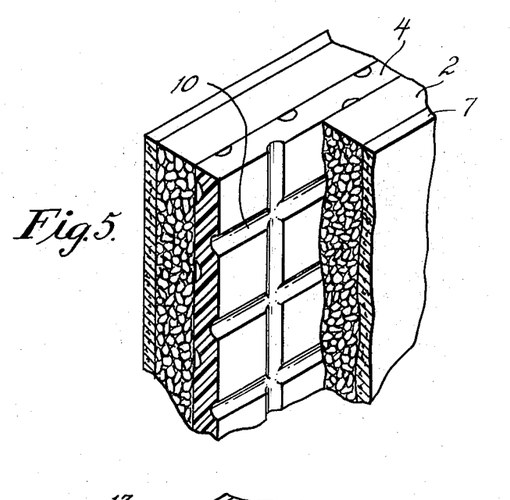

FIGS. 4 and 5 show another embodiment of the electrode body wherein 10 are grooves in connecting layer 4, which may be of a plastic or a sintered metal. These grooves are formed by suitably shaped thin rods during manufacture. The grooves provide excellent conduit means for the reaction gas. The use of such gas conduits allows for manufacturing catalytically active layers 2 with smaller pores than would be the case without such conduits.

Figure 6:
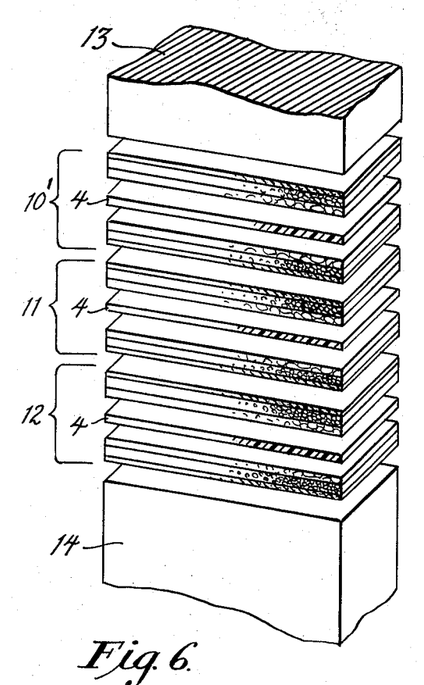
FIG. 6 illustrates an exploded view of a pack of electrode bodies of the invention, each of seven layers between the two base steel plates.

FIG. 6 illustrates in an exploded view three six-layered electrodes 10', 11 and 12 and their respective connecting layers 4; the steel covers are shown by 13 and 14.

Figure 7:
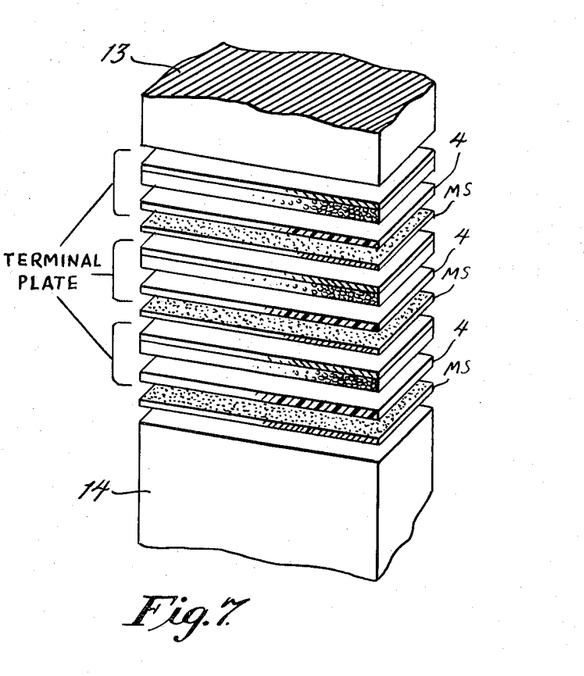
FIG. 7 is a similar illustration of a pack of terminal plates.

FIG. 7 illustrates in an exploded view three terminal plates, each being two-layered and affixed to connecting layer 4, and separable by a steel plate dusted with a suitable release agent, like talc.

Figures 8, 8A:
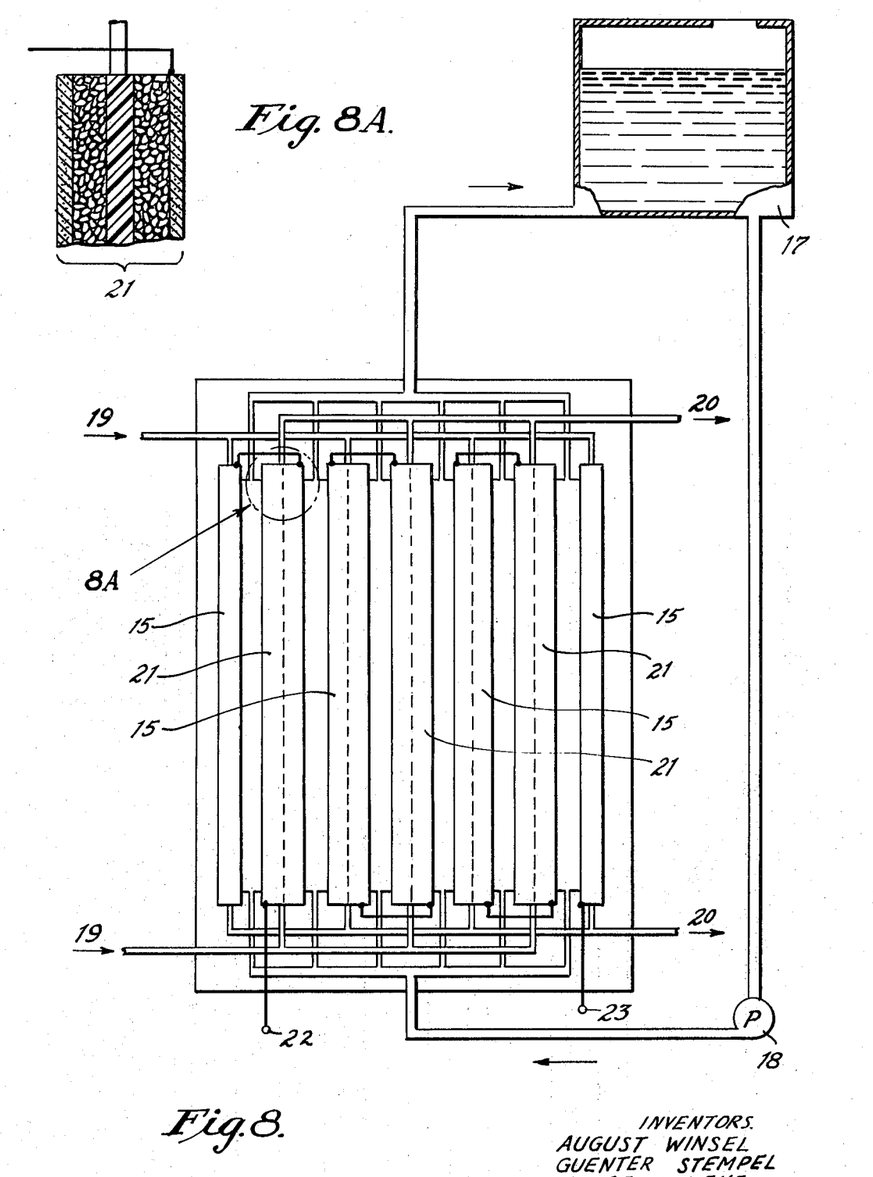
FIGS. 8 and 9 are sectional schematic views of two embodiments of a battery constructed with the electrode bodies of the invention.
Figures 9, 10, 11:
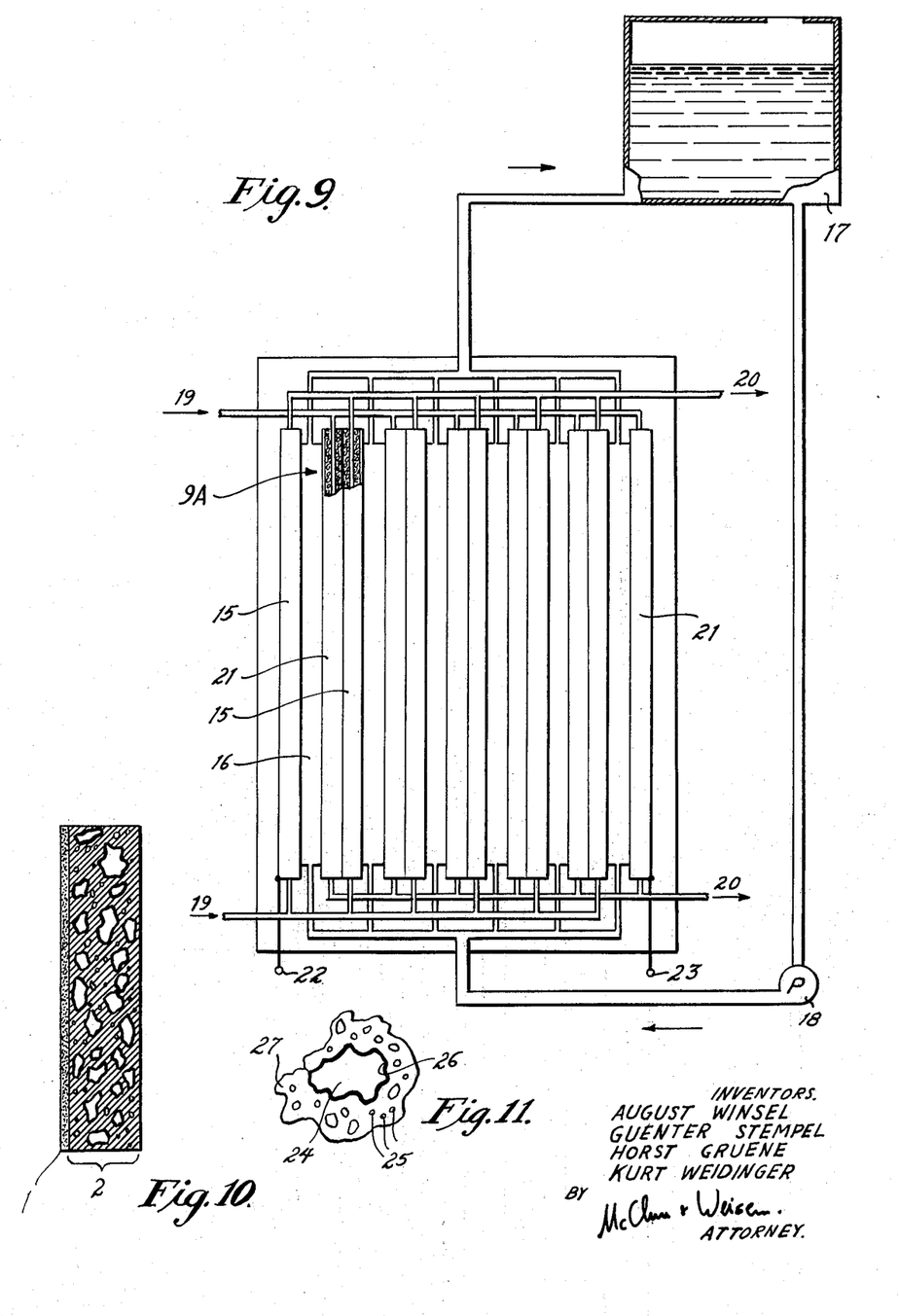
FIGS. 10 and 11 illustrate a portion of the embodiment of the invention wherein a catalytically active and gas conducting layer has affixed thereto a cover layer, FIG. 11 being a detailed section of a portion of FIG. 10.

FIGS. 8 and 9 represent schematically two fuel cell batteries of the invention wherein the single cells are electrically connected in series. The electrode bodies of different polarity are shown in FIG. 8 as 15 and 21, one set operating as gas hydrogen electrodes, the other as oxygen electrodes. In FIG. 9, separate inlet means are provided for the gases in each electrode. Electrolyte in container 17 is pumped by 18 to and from electrolyte chambers 16. Reactive gas is fed and removed from inlets 19 and outlets 20. An electric current utilization device is connected to poles 22 and 23.

FIG. 8A illustrates an enlarged view of a section of electrode 21, a common middle gas layer separating the two other portions of the electrode. Section 9A illustrates a detailed view of a portion of part of a bipolar electrode body 15 and 21, joined by the middle layer, the body operating in two adjoining cells of a battery.

FIG. 10 illustrates a portion of the electrode of the invention where 1 represents the cover layer, 2 the catalytically active and gas conducting layer, the connecting layer which adjoins layer 2 not being shown.

FIG. 11 illustrates a detailed view of a section of layer 2 of FIG. 10, wherein 24 are the large pores, 25 the small pores, 26 the catalyst, and 27 the skeleton of that portion of the electrode.

The following examples illustrate the preparation of various types of electrodes of the invention having various gas-diffusion electrodes with two catalytically operative sides bonded one onto the other, which are partic-

Example 1

Hydrogen electrodes having three layers are manufactured in accordance with the method and with the materials disclosed in U.S. Pat. No. 3,311,507, particularly in the example in columns 8 and 9. The three layers of the electrodes are made of carbonyl nickel for the cover layers, an intimate mixture of finely powdered Raney alloy and carbonylnickel for the catalytically active working layers, and of a mixture of carbonyl nickel powder with potassium chloride crystals for the gas conducting layers. The electrodes have a fine pored cover layer, a coarser porous catalytically active layer and a gas conducting layer. The dimension of the electrode is 163 × 115 mm. These electrodes are bonded to each other at their respective gas-conducting layer with a 0.5 mm. thick polyethylene foil. Ten sets of these electrode packages are strapped onto a base plate of steel. The pile of electrodes is exactly aligned and superimposed on the plate by means of six leader rods (4 in length, and 2 on the narrower side); on top the electrode pile is covered with a cover steel plate which conforms to the size of the electrodes.

The entire package of electrodes is gradually heated to about 160°C; the package is pushed under a press and compressed under a pressure of 30 kp/cm². Under these circumstances, a portion of the plastic polyethylene flows and is squeezed into the surface pores of the gas conducting layers so that the respective electrodes are permanently bonded to each other. After cooling, the press is opened, the strappings are taken apart, the electrode bodies are separated therefrom, and the excess polyethylene which had oozed onto the sides is cut off.

The instant hydrogen electrode body has the properties and the advantages of a Janus electrode with the added advantage of having electrically isolated sides. The electrode bodies of the invention can therefore, for instance, be arranged as a cell separator wall between conventional oxygen Janus electrodes. In this manner with common gas conducting means, one half of the hydrogen bonded electrode body of the invention works for the first cell and the other half for the second cell.

Example 2

There are manufactured in a known manner oxygen electrodes having three layers comprising a cover layer, a catalytically active layer and a gas-conducting layer. Useful oxygen electrodes can be manufactured in accordance with, for instance, U.S. patent application Ser. No. 383,609, now U.S. Pat. No. 3,419,437, with the material disclosed in examples 1, 2 and 14, and by the method disclosed therein. Further suitable methods and materials for manufacturing the oxygen electrode are disclosed in patent application Ser. No. 579,408, for instance, example 6 thereof. The cover layers are made of carbonyl nickel. the catalytically active working layer of a mixture comprising silver, and the gas-conducting, coarse-pored layer of carbonyl nickel. Other suitable electrodes for use therein are disclosed in application Ser. No. 585,548 now U.S. Pat. No. 3,573,038.

The dimension of the manufactured electrodes is 163 × 115 mm. As in EXample 1, the layers are bonded by a polyethylene foil 0.5 mm. thick to form an oxygen Janus type electrode, the layers being electrically isolated. The electrode bodies are assembled into a battery assembly with hydrogen bonded electrode bodies made in accordance with Example 1. In this manner, each electrode body established at the same time a cell wall and each hydrogen electrode forms a fuel cell element with the opposite oxygen electrode. When these electrode bodies are connected in series, there can be built a battery which operates with a small current and a high voltage, like known fuel cell batteries. Yet, the present electrode body has the advantage of being practically free of risks of deformation and bursting due to operating gas pressure. The electrode also has the advantage that for each electrode having two catalytically operative sides, there is needed only a common gas conducting means.

Advantageously, the connecting plastic ayer can have incorporated a filler material like magnesium oxide or similar inorganic inert material. Such fillers act to minimize portions of the plastic from being pressed out of the connecting body under the manufacturing temperatures and pressures. Advantageous amounts of filler material that can be used range from 10 percent to 95.0 percent of volume.

Example 3

A hydrogen and an oxygen electrode, each with three layers, is manufactured. Each electrode has a cover layer, a working layer and a gas layer and following the procedure of Example 1, the two gas-conducting layers of each of the oxygen and hydrogen electrodes are bonded to each other. The gas-conducting layer of each one of the hydrogen and oxygen electrodes is thus connected to the other by means of polyvinyl chloride foil. The electrode body so obtained is provided with a hydrogen and an oxygen inlet. The electrode body has all the advantages of a Janus electrode and also has a common cell wall separator.

Example 4

Electrodes are arranged in accordance with Example 3, but instead of having a polyvinyl chloride gas impervious dense foil, theere is provided a 1 mm. thick polypropylene foil, into which there has been homogeneously incorporated a high proportion of carbonyl-nickel powder. The foil contains 82 percent by weight of carbonyl-nickel, the remainder 18 percent being the polypropylene plastic. The foil is then inserted as in the above example and then bonded to electrode parts and formed as in Example 3 to a unitary bonded electrode. Keeping the pressure constant, the assembly is first warmed to an initial temperature about 155°C.

The nickel particles establish good electrical contact by bridge-forming between the hydrogen and oxygen electrodes. Thus, as these electrodes are constructed, there is obtained a bipolar operating working electrode body to which through the gas conducting layers there are fed the gases separately.

In accordance with Example 4, these electrode bodies are assembled into a fuel cell battery, leaving a space for electrolyte between each hydrogen and oxygen unitary electrode body. The electrode parts establish, by their common connecting layer, the cell-separating walls. The connecting layer also connect all cells in series over their conducting nickel bridges.

Example 5

In accordance with Example 4, a similar electrode body is built in which the connecting bridges are made from electrolyte copper power (of a particle size of less than 31 microns). There is obtained an electrode body of improved electrical conductivity.

Example 6

Example 4 is repeated, there being substituted as electrical current bridge-builder graphite power (having a particle size of less than 33 microns). The electrode body which is obtained has satisfactory electrical conductance, with minimized metal wandering and avoiding local element action.

Example 7

A nickel sheet (whose surface was oxidized anodically) of a thickness of 0.2 mm. is coated on both sides with an epoxy metal adhesive (Araldite). Each side thereof is then covered with a hydrogen electrode having three layers so that each gas conducting layer is contacting the metal adhesive. These electrodes are then bonded to each other as in Example 1 in a pack, heated at a temperaturre of 130° to 160°C. and pressed together at a minimum surface pressure of 1 kg/cm$^2$. The metal adhesive is then cured under heat in a drying oven. This electrode body has all the advantages shown by the electrode body of Example 1.

Example 8

When oxygen electrodes having three layers are bonded together in accordance with Example 7 to give a bonded electrode body and together with the corresponding hydrogen bonded electrode body, batteries are assembled which have all the properties and advantages of the batteries given in Example 2.

Example 9

In accordance with Example 7, there is bonded a hydrogen and an oxygen three-layered electrode into a bonded electrode body. It has the properties and advantages which are already discussed in Example 4.

Example 10

Following Example 7, there is substituted for the nickel foil a nickel web of 0.2 mm. sieve size. The web is immersed into an adhesive of nitrocellulose-based resin (Cohesan), then clamped between a hydrogen or oxygen two-layered electrode into a bonded electrode body. The common gas space is provided by the spaces between the wires of the web.

The electrode bodies so prepared are connected electrically by the contact of the gas conducting layers to the nickel web. The electrode bodies possess a common gas compartment by way of the nickel web. The electrode bodies exhibit the advantages of a Janus electrode, each electrode part being constructed of only two layers, the fine-pored cover layer and the catalytically active working layer whose average pore size is larger than that of the cover layer.

Example 11

Following the procedure of Example 10, the nickel web is substituted by a synthetic resin web of equivalent strength which is then coated readily with the adhesive. There is obtained an electrically isolated Janus electrode which is constructed either from two two-layered hydrogen or two-layered oxygen electrode. By providing separate electric current leads, these electrodes can be connected in a battery assembly in the conventional way.

Example 12

For the preparation of terminal plates for a fuel cell battery, there is used the apparatus assembled in accordance with Example 1 and there is inserted a triple-layered hydrogen or oxygen electrode depending on the type required. On the gas-permeable layer of the electrode there is then affixed a polyethylene disk of 0.5 to 12 mm. depending on the thickness of the electrode and thereon there is placed a flat steel plate covered on one side with a releasing material (silicone or paraffinic oil, or talc), the releasing material facing the polyethylene foil. On the steel plate there is placed again a three-layered electrode (the gas conducting layer being farthest removed from the above-described steel plate), a polyethylene foil and a steel plate covered with release material. The whole assembly is then further manufactured as shown in Example 1.

The completed electrodes can be inserted as terminal plates in fuel cell batteries without requiring additional sealing of the frontal surfaces of the batteries.

Example 13

Proceeding as in Example 12, there is used, instead of a disk of polyethylene, a disk of polymethyl methacrylate which is heated to about 150°C. before pressing.

There may also be used instead of the polyethylene and polymethyl methacrylate other thermoplastic resins such as polyvinyl chloride, polypropylene, polystyrene and others which may be prewarmed to the required flow temperature and this sheet can be adapted to fit on the outer positioned layer of the battery housing.

Example 14

A battery was assembled from five hydrogen electrodes, four oxygen electrodes and two terminal oxygen electrodes. The electrodes are manufactured in accordance with the preceding examples. Their dimensions are: 163 × 115 × 3.8 mm. The battery had an output of 70 watts at a current density of 50 mA/cm at an operating temperature of 60°C. This value corresponds to a power/weight ratio of 40 kg/kw and a power/volume ratio of 20 l/kw.

A conventional battery assembled from conventional electrodes required the use of smaller and thicker electrodes in order to have the requisite mechanical strength. A battery of 10 cells was assembled from 10 oxygen and 10 hydrogen electrodes (dimension: 80 mm.$\phi$, 3.5 mm. thickness). The output was 18 watts, corresponding to a power/weight ratio of 140 kg/kw and power/volume ratio of 120 l/kw.

The battery of the invention thus operates much more efficiently than a conventional battery.

From the description of the various embodiments of the electrodes of the invention, it is apparent that the middle layer and the covering layers of the electrode are catalytically inactive, the gas conducting layer, when it is a distinct layer from the catalytically active layer, is also a catalytically inactive layer of the electrode.

We claim:

1. A multilayered gas diffusion unitary electrode body having two catalytically active electrodes for an electrochemical apparatus, fuel cell elements and electrolysis cells, said gas diffusion electrode comprising two catalytically active working layers, and a connecting layer which is positioned and connected to the opposite inside faces of the two catalytically active working layers, said connecting layer being gas-impervious except for gas bores for supplying gas to and through said layer into the adjoining two catalytically active layers, and a covering layer affixed onto each outer face of each catalytically active working layer, said covering layer being electrolyte-pervious and gas-impervious and having an average pore size smaller than the average pore size of the adjoining catalytically active layer, said connecting layer being electrically insulating and comprising polyethylene resin and powdered magnesium oxide in a proportion of about 30 to 70 percent by weight, respectively.

2. A multilayered gas diffusion unitary electrode body having two catalytically active layers for an electrochemical apparatus, fuel cell elements and electrolysis cells, said gas diffusion unitary electrode body comprising an interiorly positioned, connecting layer comprising an electrically conductive resinous material, an intermediate gas-coducting, catalytically active layer affixed onto each face of said connecting layer, and a porous covering layer affixed onto the respective outer faces of the defined intermediate layer, the average pore radius of each of the covering layers being smaller than the average pore radius of the intermediate layer, said layers forming a unitary electrode body, and said connecting layer comprising 3 to 20 percent by weight of a polyalkylene resin, the remainder being carbonyl nickel.

3. A multilayered gas diffusion unitary electrode body having two catalytically active layers for an electrochemical apparatus, fuel cell elements and electrolysis cells, said gas diffusion electrode comprising two catalytically active working layers, and a connecting layer which is positioned between and connected to the opposite inside faces of the two catalytically active working layers, said connecting layer comprising resinous material and being gas-impervious except for gas bores for supplying gas to and through said layer into the adjoining two catalytically active layers and comprising electrically insulating powdered magnesium oxide or aluminum oxide, and a covering layer affixed onto each outer face of each catalytically active working layer, said covering layer being electrolyte-pervious and gas-impervious and having an average pore size smaller than the average pore size of the adjoining catalytically active layer.

* * * * *